(12) United States Patent
Regnier

(10) Patent No.: US 10,191,630 B2
(45) Date of Patent: Jan. 29, 2019

(54) GRAPHICAL INTERFACE AND METHOD FOR MANAGING SAID GRAPHICAL INTERFACE DURING THE TOUCH-SELECTION OF A DISPLAYED ELEMENT

(71) Applicant: RENAULT s.a.s., Boulogne-Billancourt (FR)

(72) Inventor: Stephane Regnier, Verrieres le Buisson (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 60 days.

(21) Appl. No.: 15/528,359

(22) PCT Filed: Nov. 19, 2015

(86) PCT No.: PCT/FR2015/053126
§ 371 (c)(1),
(2) Date: Jun. 16, 2017

(87) PCT Pub. No.: WO2016/079433
PCT Pub. Date: May 26, 2016

(65) Prior Publication Data
US 2017/0364243 A1    Dec. 21, 2017

(30) Foreign Application Priority Data

Nov. 21, 2014   (FR) .................................. 14 61286

(51) Int. Cl.
*B60K 35/00*       (2006.01)
*B60K 37/06*       (2006.01)
(Continued)

(52) U.S. Cl.
CPC .......... *G06F 3/04842* (2013.01); *B60K 35/00* (2013.01); *B60K 37/06* (2013.01);
(Continued)

(58) Field of Classification Search
None
See application file for complete search history.

(56) References Cited

U.S. PATENT DOCUMENTS 8,624,836 B1 *  1/2014  Miller ................... G06F 1/163
                                                     345/157
2009/0201246 A1  8/2009  Lee et al.
(Continued)

FOREIGN PATENT DOCUMENTS

EP    2 105 826 A2    9/2009
FR    3 002 052 A1    8/2014

OTHER PUBLICATIONS

International Search Report dated Mar. 9, 2016 in PCT/FR2015/053126 filed Nov. 19, 2015.
(Continued)

*Primary Examiner* — Asher D Kells
(74) *Attorney, Agent, or Firm* — Oblon, McClelland, Maier & Neustadt, L.L.P.

(57) ABSTRACT

A touch interface includes a display screen. The interface detects an approach and a position of a finger of a user with respect to the screen. The interface displays on the screen at least one graphical element associated with a touch-selection zone, surrounding an anchor point of the graphical element on the screen. The interface estimates a trajectory of a point of the finger and an impact point of the trajectory on the screen, and moves the graphical element in the direction of the impact point, when a distance between the anchor point and the impact point falls below a first threshold.

10 Claims, 3 Drawing Sheets

Figure 1:
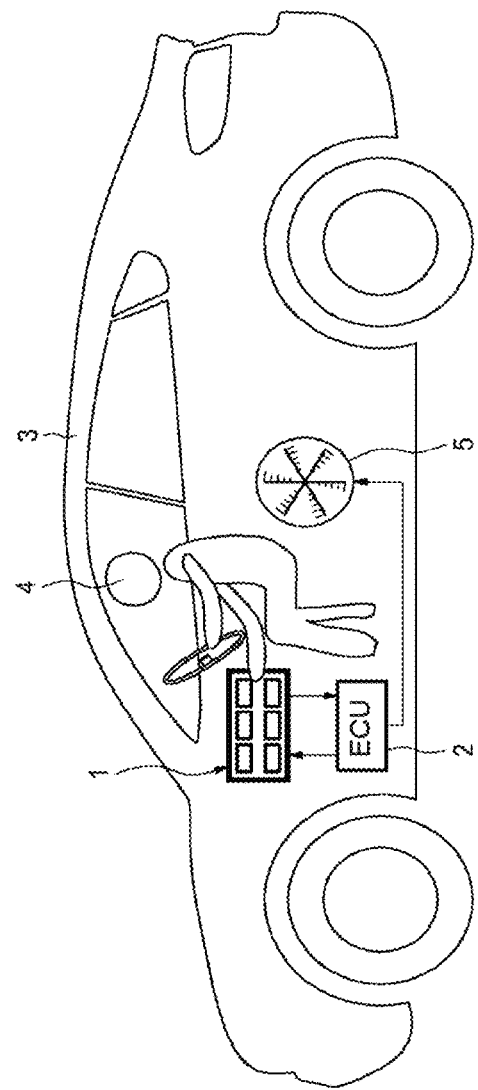

(51) Int. Cl.
  *G06F 3/041* (2006.01)
  *G06F 3/0481* (2013.01)
  *G06F 3/0482* (2013.01)
  *G06F 3/0484* (2013.01)
  *G06F 3/0488* (2013.01)

(52) U.S. Cl.
  CPC ............ *G06F 3/041* (2013.01); *G06F 3/0412* (2013.01); *G06F 3/0488* (2013.01); *G06F 3/04812* (2013.01); *G06F 3/04845* (2013.01); *G06F 3/04883* (2013.01); *B60K 2350/1028* (2013.01); *G06F 3/0482* (2013.01); *G06F 2203/04101* (2013.01); *G06F 2203/04108* (2013.01); *G06F 2203/04806* (2013.01)

(56) References Cited

U.S. PATENT DOCUMENTS

| | | |
|---|---|---|
| 2009/0247233 A1 | 10/2009 | Kim |
| 2009/0247234 A1 | 10/2009 | Kim |
| 2011/0083089 A1* | 4/2011 | Pahud .................. G06F 3/0425 715/765 |
| 2011/0157040 A1 | 6/2011 | Kashio |
| 2011/0285665 A1 | 11/2011 | Matsumoto |
| 2012/0120002 A1 | 5/2012 | Ota |
| 2014/0028557 A1 | 1/2014 | Otake et al. |
| 2015/0123918 A1 | 5/2015 | Kim |
| 2016/0004348 A1 | 1/2016 | Roziere |
| 2016/0027201 A1* | 1/2016 | Saito ................. H04N 5/23216 345/475 |
| 2016/0216837 A1* | 7/2016 | Nolan ..................... G06F 3/005 |
| 2017/0308259 A1* | 10/2017 | Regnier ................ B60K 37/06 |
| 2017/0364207 A1* | 12/2017 | Henderson .......... G06F 3/04842 |
| 2018/0004386 A1* | 1/2018 | Hinckley .............. G06F 3/0416 |

OTHER PUBLICATIONS

French Search Report dated Jul. 16, 2015 in FR 1461286 filed Nov. 21, 2014.

* cited by examiner

GRAPHICAL INTERFACE AND METHOD FOR MANAGING SAID GRAPHICAL INTERFACE DURING THE TOUCH-SELECTION OF A DISPLAYED ELEMENT

The subject matter of the invention is touch interfaces, notably touch interfaces on board motor vehicles, or touch interfaces used to control systems on which a user intervenes while being constrained to maintain their attention focused on other tasks, e.g. on monitoring a production machine.

In such configurations, the user has to interact with the touch interface while keeping their attention mostly available for tasks other than operating the interface, and, if the interface is not very large, the user may experience difficulties in selecting the element from a menu. For selecting such an element from a menu, the user must apply their finger to a given site on the interface corresponding to a touch-selection zone of the menu element, highlighted on the screen by an icon or more generally a graphic symbol displayed on the screen substantially at the site of the touch-selection zone. In particular, in a motor vehicle, when the vehicle is in motion the selection gestures of the user, who has to constantly watch the road, may be imprecise.

In order to overcome these drawbacks, some manufacturers of mobile terminals have developed large size screens or text input systems, in which, for example, a letter touched with the finger is graphically enlarged. This enlarged display, remote from the site where the icon to be activated and the finger are located, is maintained for a brief period of time, sufficiently long, however, for the user to read the letter that they have entered, thus performing a visual check to verify that they have performed the input that they desired. This type of display always means having to perform the input on a restricted and different zone of the screen at each new letter.

The object of the invention is to provide a human/machine interface system making it possible to reduce the occurrences of error in inputting elements of a menu, by facilitating the input of the graphical element desired by the user, without necessarily increasing the size of the screen, and by leaving more margin in the gestures to be performed for performing the input.

For this purpose, the invention provides a graphical interface or touch interface comprising a screen capable of detecting the approach and the position of a user's finger. Detection preferably takes place inside a predefined volume, characterized in particular by a detection threshold distance with respect to the screen. Detection therefore takes place at least in a predefined volume, but could be extended to a wider space. The interface is configured for displaying on the screen at least one graphical element associated with a touch-selection zone, surrounding an anchor point of the graphical element on the screen. The interface is configured for estimating a trajectory of a point of the finger and the impact point of this trajectory on the screen, and is configured for moving the graphical element in the direction of the impact point when the distance between the anchor point and the impact point falls below a first threshold. The direction of movement of the graphical element may be defined by the movement of a particular point of the graphical element, that is henceforth referred to in the description as an anchor point in its initial position, and as a centering point once moved.

The "screen" of the touch interface, or graphical interface, here refers to three two-dimensional regions of space which are superimposable on each other, by means of an optional calculation of change of coordinates managed by an electronic control unit managing the detection operations performed via the touch interface as well as the displays on the screen of the touch interface.

The first of these three regions is constituted by the display screen in the strict sense, making it possible to display the graphical elements for the attention of the user for indicating to them the regions of the space with which they have to interact.

The second region is a detection unit of the touch interface or graphical interface, associated with a touch screen type sensitive flat surface, superimposed on the display screen, or associated with another detection system in the space notably making it possible to detect the position of the user's finger in the vicinity of the display screen, then identified in the coordinates specific to the detection interface.

The third region is defined by coordinate values of points on a reference virtual screen, stored by the electronic control unit and grouped by regions of the virtual screen, expressed in a coordinate system specific to the electronic control unit. These regions of the virtual screen are, for example, defined by surface zones or by sets of boundary lines. The initial anchor points of the graphical elements are stored with respect to these regions, then their subsequent centering points are calculated, and the coordinates of the other points of each graphical element are also calculated at each instant which may then be translated into the coordinate system of the display screen. The position of the finger in the coordinates of the detection interface may, for example, be translated into the coordinate system of the electronic control unit for identifying its position with respect to the different boundaries, then for calculating the positions of the centering points of the displayed graphical elements over time, which are then translated into positions on the display screen.

The graphical element and the touch-selection zone initially both surround the anchor point, but may no longer surround this anchor point once moved. The position of the anchor point of the graphical element remains fixed during the display of a selection menu given during the interaction between the finger and the interface, until optionally a contact of the finger on the screen triggers the display of another selection menu.

The operator's finger may be replaced in an equivalent manner by an element detectable by the interface, e.g. an elongated object, such as a stylus, suitable for allowing the detection of a particular geometric point by the touch interface.

The anchor point of the graphical element is a particular point on the screen associated with this graphical element, preferably contained inside the boundaries of the graphical element for a reference display state of the interface, corresponding, for example, to the display of a particular selection menu in the absence of any interaction in progress with the finger.

The graphical element may be a surface or linear display pattern, comprising one or more colors. Preferably, the graphical element defines an outline or a visible surface on the screen coinciding with the outlines or the surface of the associated touch-selection zone.

The anchor point may be typically a geometric barycenter of a surface or of an outline defining the visible boundaries of the graphical element in its display position in the absence of any interactions. According to some variant embodiments, the anchor point of the graphical element may be off-center with respect to the graphical element, e.g. it may be offset toward an edge of the screen to which the graphical element is the closest, in order to limit the risks of overlap between the moved graphical element and the edge of the screen.

According to variant embodiments, the distance threshold may be the same in all directions around the anchor point. According to another variant embodiment, the distance threshold may be a function of the angular position of the impact point around the anchor point, so as to define a non-circular boundary inside which the detection of the impact point triggers a movement of the graphical element. A specific function may then be associated with each graphical element of the interface. The display of the graphical element translated at a given moment preferably replaces the initial display of the graphical element and the other preceding displays, if there are any, of the graphical element.

The interface may be configured, when crossing the first threshold, for calculating a translation vector of the anchor point to a temporary centering point, and for performing a corresponding translation of the display of the graphical element. Temporary centering point is understood to mean a point on the screen on which the graphical element is centered during at least some phases of interaction of the interface with the finger. Centering here is understood in the broad sense of the term, the centering point being capable of being, for example, a surface barycenter, or a barycenter of some characteristic points of the graphical element, the weighting coefficients of this barycenter being constant but not necessarily equal from one characteristic point to another. The representation of the graphical element around the temporary centering point may then be a translation, a homothety, or may be a bidirectional dilation of the initial representation of the graphical element around the anchor point thereof. In a preferred embodiment, this anchor point and the temporary centering point are not apparent on the displayed graphical element. The homothety ratio or the dilation ratios are preferably greater than or equal to 1 as soon as the centering point no longer coincides with the initial anchor point. The temporary centering point is located on a line between the anchor point and the impact point.

The first distance threshold may be a variable function of an angular position of the impact point around the anchor point. In other words, the distance threshold defines a non-circular boundary around the anchor point, this boundary delimiting a field of influence inside which the interface is configured for activating the movement of the display of the graphical element.

The interface may be configured for calculating the position of the temporary centering point as a barycenter between the initial anchor point and the impact point, the relative distance between the centering point and the impact point being an increasing function of the distance between the finger and the screen. Here barycenter is understood to mean a weighted barycenter between two points with weighting coefficients that may be variable functions, e.g. a function of the distance between the finger and the screen. According to another variant embodiment, the relative distance between the centering point and the impact point is an increasing function of the distance between the finger and the impact point. Preferably, this function is canceled when the finger touches the screen. Here relative distance, or relative approach distance, refers to the ratio between the movement applied to the centering point, and the distance between the anchor point and the impact point. According to a first variant embodiment, this relative approach distance does not depend on the distance between the impact point and the anchor point. According to another variant embodiment, this relative distance may be decreasing with the distance between the impact point and the anchor point, e.g. if the graphical element is small compared to the distance separating two graphical elements. Thus, the finger may be positioned above the graphical element even when same is offset close to the zone of influence—defined later—of another graphical element. According to another variant embodiment, this relative distance may be increasing with the distance between the impact point and the anchor point, e.g. if the graphical element is of a size comparable to the distance separating two graphical elements. This avoids the "moved" graphical element from unduly encroaching on the zones of influence of neighboring graphical elements. According to yet another embodiment, this relative approach distance, as the first distance threshold, may further be a variable function of an angular position of the impact point around the anchor point.

The interface may be configured, when crossing the first threshold, for displaying the translated graphical element by dilating this graphical element, along at least one direction, according to an enlargement factor. The dilation may correspond to a bidirectional homothety, but may, in some variant embodiments, correspond to a dilation having two different ratios along two perpendicular axes of the screen. The dilation may correspond to a unidirectional dilation. For example, if the graphical element is located near a display edge the screen, the graphical element may be dilated more, or dilated only along the direction perpendicular to this edge, in order to delay the moment when the graphical element overlaps the edge of the screen if the finger approaches this edge. The enlargement factor, i.e. the ratio of the homothety or the highest ratio of the bidirectional dilation, is preferably between 1.1 and 1.5, and preferably between 1.15 and 1.35. The graphical element may alternatively, or in addition to the change of dimension, be highlighted by a change in brightness, contrast, color, or fill pattern.

Advantageously, the interface may be configured, when crossing the first threshold, for displaying the translated graphical element at the new position corresponding to the crossing of the threshold, then, when the distance between the anchor point and the impact point falls below the first threshold, periodically calculating a new translation vector each time taking into account an updated impact point, and for displaying the translated graphical element of the corresponding vector. According to a first embodiment, the size of the displayed graphical element remains constant as long as the centering point differs from the anchor point. According to another embodiment, the interface may be configured for then reducing the size of the graphical element to an intermediate size between its initial size and its size at the moment of crossing the first distance threshold. According to yet other embodiments, the interface may be configured for continuing to increase the size of the graphical element once the threshold is crossed.

Preferably, the interface is configured for moving, with the displayed graphical element, the zone taken into account as the touch-selection zone.

The movement takes place along the same vector linking the anchor point to the temporary centering point. If the graphical element is displayed dilated by one or more enlargement factors, the touch-selection zone is dilated by the same enlargement factor(s).

When the distance between the anchor point and the impact point rises above a second threshold, the interface may be configured for bringing back the display of the graphical element to its initial position around the anchor point. The second threshold may be identical to the first threshold. The display of the graphical element also returns to its initial size and appearance (brightness, color, graphical relief effect, etc.) before crossing the first distance threshold. According to a variant embodiment, the return to the original display may be performed only if exceeding the first threshold extends beyond a time-out threshold. According to the variant embodiments, from the instant of its being triggered, the return to the original display may be performed without any transition, or may be performed by displaying the graphical element at a series of positions, and with a series of intermediate sizes, between the initial position and the last position before the return is triggered. The return trajectory may take place, for example, in a straight line, with a progressive decrease in the size of the graphical element between its size when the return is triggered, and its initial size outside of interactions with the finger. According to another variant embodiment, the size of the graphical element may be brought back to its initial size at the beginning of the return of the graphical element to its original position.

According to a particular embodiment, the interface may be configured for displaying on the touch screen at least one first graphical element associated with a first touch-selection zone, a first anchor point and a first distance threshold first function, and for displaying at least one second graphical element associated with a second touch-selection zone, a second anchor point and a first distance threshold second function. The first distance threshold first and second function define around the first and the second anchor point, respectively, a first boundary of a first field of influence and a second boundary of a second field of influence. The interface may then be configured to allow, at least at times, a selection by contact of the finger at a contact point in the first touch-selection zone, while the first touch-selection zone temporarily overlaps the second field of influence and the contact point is located in the second field of influence.

The invention further provides a method for managing a touch interface, the interface being capable of detecting the approach and the position of a user with respect to a screen of the interface, in which:

in a first step at least one graphical element is displayed on the screen associated with a touch-selection zone, surrounding an anchor point of the graphical element on the screen, and located inside the same zone of influence;

a trajectory of a point of the finger and the impact point of this trajectory on the screen are repeatedly estimated;

when the impact point enters the zone of influence, the displayed graphical element and the associated touch-selection zone are moved in the direction of the impact point;

as long as the impact point remains in the zone of influence, the graphical element and the associated touch-selection zone are displayed at a position which is a function of the updated impact point, and which becomes closer to the impact point as the finger approaches the screen.

By convention, the distance between the impact point and the graphical element is measured as the distance between the impact point and a centering point obtained by applying the translation vector of the graphical element to the initial centering point.

The relationship between the proximity of the finger to the screen and the proximity between the impact point and the moved equivalent of the anchor point is not necessarily linear.

Figure 2:
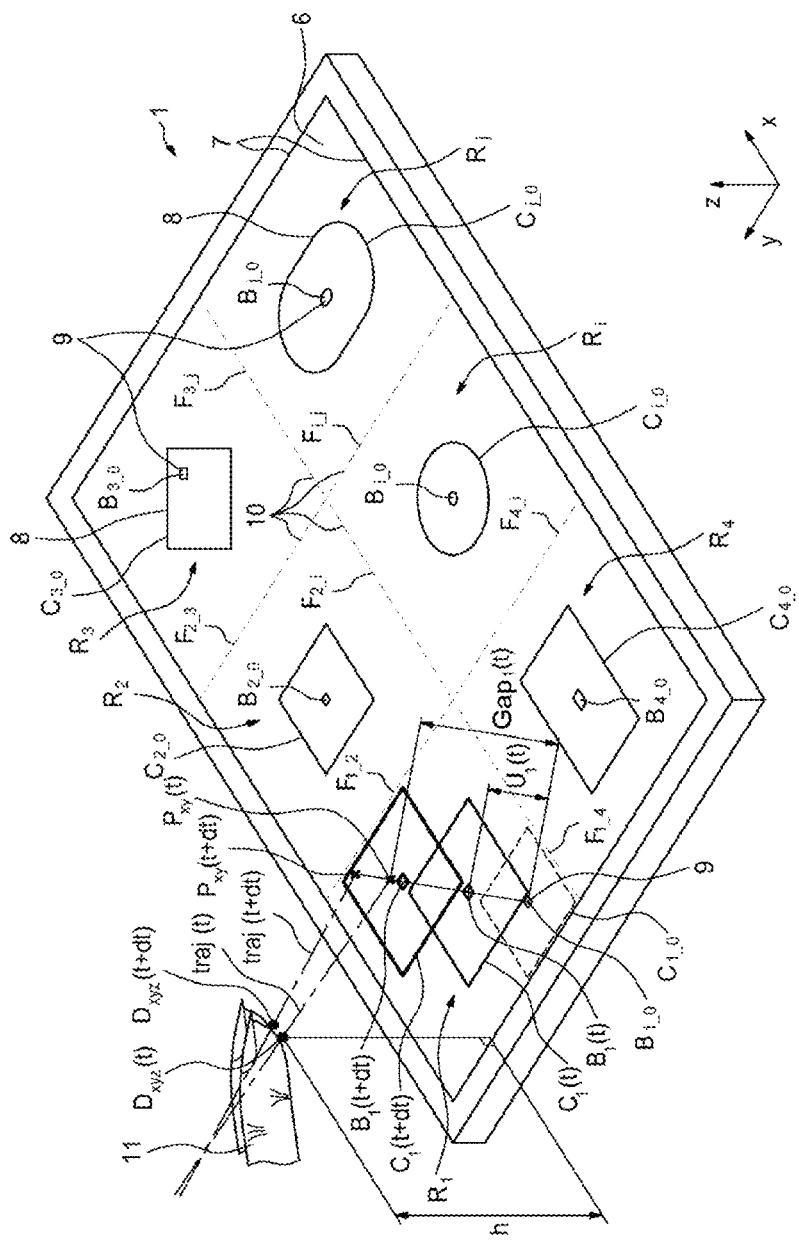
Figure 3:
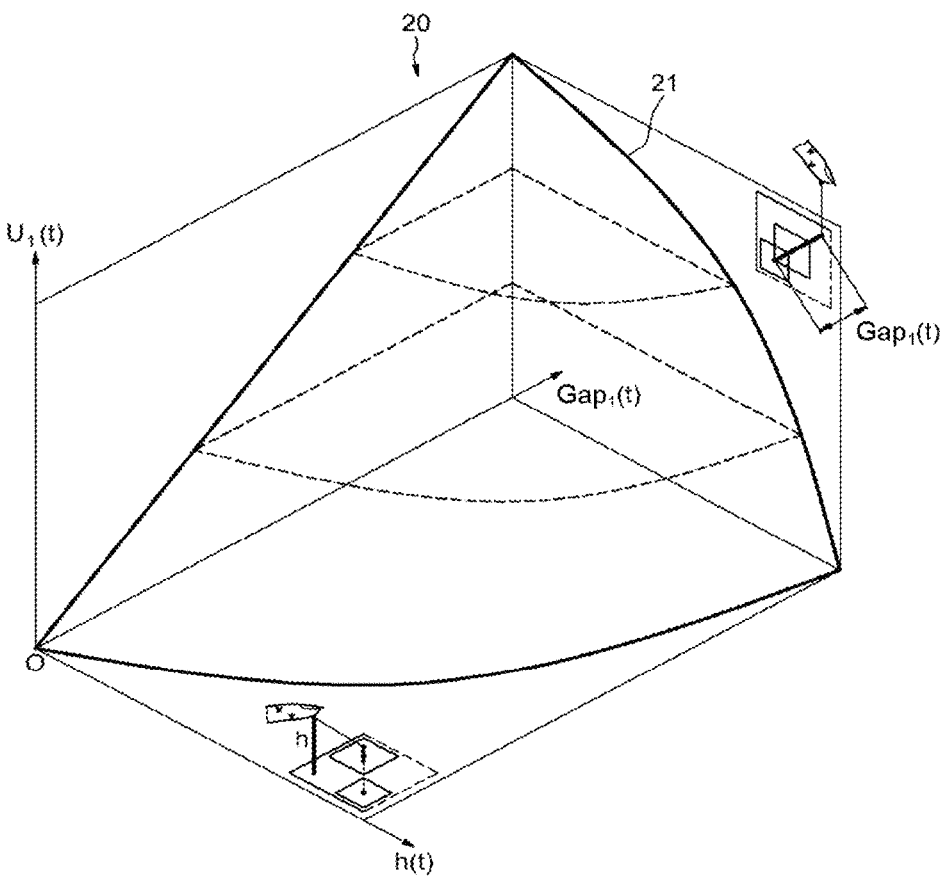

Other objects, features and advantages of the invention will appear on reading the following description, given solely as a non-restrictive example with reference to the accompanying drawings in which:

FIG. 1 illustrates a motor vehicle provided with an interface according to the invention, FIG. 2 illustrates a human-machine interface according to the invention, and FIG. 3 is a characteristic graph of one of the modes of operation of the interface in FIG. 2.

As illustrated in FIG. 1, a touch interface according to the invention may be, for example, on board a motor vehicle 3 driven by a user 4 who, by moving their finger and touching some points of a screen of a touch interface 1, is thus able to transmit instructions to an electronic control unit 2 for operating different equipment of the vehicle, e.g. a ventilation system 5 of the vehicle or any other equipment of the vehicle.

The electronic control unit 2 may also send back to the touch interface messages expressing the operating state of the vehicle so that the user 4 of the vehicle can take these data into account.

FIG. 2 illustrates the operating principle of a touch interface 1 according to the invention. The touch interface 1 typically includes a touch screen 6, delimited by edges 7, and a detection system (not represented) for detecting the position of a user's finger 11, notably a particular point $D_{xyz}$ of this finger, and for detecting whether this finger is or is not in contact with the touch screen. Touch screen here designates any input system by moving a finger and by this finger approaching a validation surface. The invention may, for example, be applied to detection systems optically projecting information onto an inert surface and observing the neighboring volume of this surface by means of various optical or infrared sensors, for example, so as to detect the position of a finger and so as to detect whether the finger is or is not in contact with the surface.

The touch screen 6 is typically delimited by means of boundaries 10 designated here by $F_{1\_4}$, $F_{1\_2}$, $F_{4\_i}$, $F_{2\_i}$, $F_{2\_3}$, $F_{i\_j}$ in regiosn or zones of influence, which are in FIG. 2 referenced by $R_1$, $R_2$, $R_3$, $R_4$, $R_i$ and $R_j$. Each region corresponds to a selection zone of a menu displayed on the touch screen. The regions capable of giving rise to an act of validation each display a graphical element referenced here by 8 and more particularly referenced according to the regions $C_{1\_0}$, $C_{2\_0}$, $C_{3\_0}$, $C_{4\_0}$, $C_{i\_0}$, $c_{j\_0}$.

These graphical elements indexed with 0 correspond to an initial display of the menu on the graphical screen. The graphical interface is configured for detecting the movement of the finger 11 and in particular of one end $D_{xyz}$ of this finger which at an instant t is located at the point $D_{xyz}(t)$ and at the next instant t+dt is located at a point $D_{xyz}(t+dt)$.

The graphical interface is capable of determining, for example by extrapolation of the successive detected points, a trajectory which is reestimated at each instant and which is denoted by traj(t) in FIG. 2 for the estimated trajectory at the instant t, and which is denoted by traj(t+dt) for the estimated trajectory at the instant t+dt. Each of these calculated trajectories defines a point $P_{xy}$ that is designated here as an impact point, although the impact remains at first theoretical. This point $P_{xy}$ is the intersection of the trajectory and a contact surface of the screen which may coincide with the display surface of the screen 6.

When the impact point is located sufficiently close to one of the graphical elements, the invention provides for modifying the display of the graphical element and bringing it closer to the impact point, in order to facilitate the work of the user who may thus continue to validate the corresponding option of the menu without moving their finger aside from the trajectory in progress. To do this, for each graphical element a virtual anchor point 9 is arbitrarily defined, which may not appear in the display, and which serves both for estimating the distance between the graphical element and the impact point and for calculating the subsequent movements of the display of the graphical element.

In FIG. 2, these anchor points are identified respectively by the references $B_{1\_0}$, for the graphical element $C_{1\_0}$, $B_{2\_0}$ for the graphical element $C_{2\_0}$, ... $B_{j\_0}$ for the graphical element $C_{j\_0}$.

These anchor points may, for convenience, correspond to a surface barycenter of the graphical element, or to a barycenter of an outline of the graphical element. According to a variant embodiment, they may optionally be located arbitrarily near one of the boundaries of the graphical element.

For determining whether the display of the graphical element $C_{1\_0}$ of the region $R_1$ has to be moved, the distance denoted here by $gap_1(t)$ may be compared either with a constant threshold, or with a threshold which depends on the direction of the straight line linking the centering point $B_{1\_0}$ and the impact point $P_{xy}(t)$. For example, it is possible to verify whether the impact point is located inside the boundaries delimiting the region in which the graphical element considered is located in its initial state in the absence of any interaction with the finger.

In FIG. 2, the distance at an instant t of the impact point $P_{xy}(t)$ of the trajectory traj(t) calculated at this instant t and of the anchor point $B_{1\_0}$ is denoted by $Gap_1(t)$. As a function of this distance, and also as a function of the distance of the finger to the screen, a movement is applied to the graphical element $C_{1\_0}$ denoted here by $U_1(t)$, which at a given instant corresponds to a vector joining the anchor point $B_{1\_0}$ and a temporary centering point $B_1(t)$ occupying with respect to the moved graphical element $C_1(t)$ the same barycentric position that the anchor point $B_{1\_0}$ initially occupies with respect to the graphical element $C_{1\_0}$ in its initial display configuration.

At a subsequent instant t+dt, the recalculated trajectory defines a new impact point $P_{xy}(t+dt)$ the position of which is used in conjunction with the distance of the finger to the screen for calculating a new position of the centering point $B_1(t+dt)$ of the graphical element $C_1(t+dt)$ displayed at this moment.

In order to improve the perception by the user of the graphical element which is on the point of being selected, it is possible, as soon as the movement of the display of the graphical element is activated, to accompany this movement with a dilation of the dimensions of the graphical element, e.g. a homothety along all directions or optionally, according to the available space on the screen, a dilation along one of the directions of the screen.

The size of the graphical element may then be maintained constant as long as the movement of the display of the graphical element continues being effective. According to the size of the graphical element and the amplitude of the movement, it may happen that the graphical element overlaps one of the boundaries between regions. For example, in FIG. 2, the graphical element $C_1(t+dt)$ is on the point of overlapping the boundary $F_{1\_2}$. A touch-selection zone is associated with each graphical element, which when it is touched by the user's finger triggers an action corresponding to one of the options in the menu displayed on the screen. Preferably, the touch-selection zone coincides with the surface occupied by the graphical element.

The interface according to the invention may be configured so that, if, following the trajectory performed by the finger, the graphical element and the associated touch-selection zone overlap one of the boundaries and the finger comes into contact with the screen at a point of the graphical element displayed at this instant, a validation on the associated touch-selection zone is then taken into account, even if the contact point is located at this instant beyond the boundary of the region associated with the graphical element.

In this way, the user's input is facilitated, since in a way the effective boundary of the region allowed for selecting an element from the menu changes shape to some extent according to the trajectory of the user's finger, so as to widen the total selection region allowed by temporarily moving its boundaries.

FIG. 3 illustrates an example of a graph 20 linking the amplitude of the movement denoted here by $U_1(t)$ of a graphical element on an interface according to the invention, as a function of a distance h(t) between a user's finger and the screen, and a distance $Gap_1(t)$ between the impact point of the trajectory of the finger and the initial anchor point of the graphical element. The mapped surface 21 is here chosen for canceling any movement of the graphical element when the distance of the finger to the screen exceeds a certain threshold $h_0$, which may typically be the detection threshold distance of the touch interface. The mapped surface 21 is also chosen for canceling any movement of the graphical element when the impact point approaches the anchor point, since there is then no longer any need to move the graphical element. Typically, the value $U_1(t)$ of movement may be chosen as a product between the distance $Gap_1(t)$ and a function which is chosen as an increasing function of the distance of the finger to the screen, a function that is canceled for a distance threshold value $h_0$. One of the forms of possible functions for defining the movement vector $U_1(t)$ is to directly multiply the distance $Gap_1(t)$ by a concave or convex function of the distance h from the finger to the screen. This concave or convex function may be, for example, a power of the difference from 1, of a ratio between the distance h from the finger and the threshold distance $h_0$.

If a power ½ is chosen for this function, the expression provided in equation (1) is obtained, corresponding to the graph in FIG. 3:

$$U_1(t) = \text{Dist}(B_{1\_0}, P_{xy}(t)) \times \sqrt{(1-h(t)/h_0)} = \text{Gap}_1(t) \times \sqrt{(1-h(t)/h_0)} \qquad \text{Equation (1)}.$$

The advantage of choosing such a form of convex function is that it has an effect of "slowing down" the movement of the graphical element when the finger is in the immediate neighborhood of the screen, which avoids disturbing the user before the final selection. Another variant function U(t) may be envisaged, in which a power function is also applied to the distance $Gap_1(t)$ between the anchor point and the impact point, so as, for example, to slow down the movement of the graphical element when approaching the bounds of the region associated with the graphical element considered. The distance of the finger to the screen may be taken as an orthogonal distance h of the finger to the screen, as represented in FIGS. 2 and 3, but variant embodiments may be envisaged in which the distance of the finger to the screen is taken as the distance between the point $D_{xyz}$ of the finger closest to the screen and the impact point $P_{xy}(t)$ of the trajectory at this instant.

From another point of view, a relative distance may be defined between the centering point $B_1(t)$ of the graphical element and the impact point $P_{xy}(t)$ as a ratio of distance $\Delta_1(t)$, defined as:

$$\Delta_1(t) = \frac{Gap_1(t) - U_1(t)}{Gap_1(t)}. \qquad \text{Equation (2)}$$

This relative distance gives the remaining gap to be traveled to the graphical element so that this graphical element is centered on the impact point.

This relative distance decreases when the finger approaches the screen and is canceled when the finger touches the screen.

The invention is not limited to the exemplary embodiments described and may have many variants. The position of the finger with respect to the interface may be detected by any touch means or any selection means by positioning the end of a finger. The functions for calculating the movement of a graphical element may differ from those cited in the examples. Time-outs may be introduced in some steps of the process of modified display of the graphical element or elements. Transparent display modes of one graphical element with respect to another may be provided if two graphical elements have to be displayed over intercepting zones.

The invention claimed is:

1. A touch interface, comprising:
    a display screen, the interface being configured to detect an approach and a position of a finger of a user with respect to the screen, the interface being configured to display on the screen at least one graphical element associated with a touch-selection zone, surrounding an anchor point of the graphical element on the screen,
    wherein the interface is configured to estimate a trajectory of a point of the finger and an impact point of the trajectory on the screen, and is configured to move the graphical element in the direction of the impact point, when a distance between the anchor point and the impact point falls below a first threshold.

2. The touch interface as claimed in claim 1, in which the interface is configured, when crossing the first threshold, to calculate a translation vector of the anchor point to a temporary centering point, and to perform a corresponding translation of the display of the graphical element.

3. The touch interface as claimed in claim 2, in which the first threshold is a variable function of an angular position of the impact point around the anchor point.

4. The touch interface as claimed in claim 2, in which the interface is configured to calculate a position of the temporary centering point as a barycenter between the initial anchor point and the impact point, a relative distance between the centering point and the impact point being an increasing function of the distance between the finger and the screen.

5. The touch interface as claimed in claim 2, in which the interface is configured, when crossing the first threshold, to display the translated graphical element by dilating the graphical element, along at least one direction, according to an enlargement factor.

6. The touch interface as claimed in claim 2, in which the interface is configured, when crossing the first threshold, to display the translated graphical element at a new position corresponding to the crossing of the first threshold, then, when the distance between the anchor point and the impact point falls below the first threshold, periodically calculating a new translation vector each time taking into account an updated impact point, and to display the translated graphical element of the corresponding vector.

7. The touch interface as claimed in claim 1, in which the interface is configured to move, with the displayed graphical element, the touch-selection zone.

8. The touch interface as claimed in claim 7, in which the interface is configured to display on the touch screen at least one first graphical element associated with a first touch-selection zone, a first anchor point, and a first distance threshold first function, and to display at least one second graphical element associated with a second touch-selection zone, a second anchor point, and a first distance threshold second function, the first distance threshold first and second function defining around the first and the second anchor points, respectively, a first boundary of a first field of influence and a second boundary of a second field of influence, the interface being configured to allow, at least at times, a selection by contact of the finger at a contact point in the first touch-selection zone, while the first touch-selection zone temporarily overlaps the second field of influence and the contact point is located in the second field of influence.

9. The touch interface as claimed in claim 1, in which the interface is configured, when the distance between the anchor point and the impact point rises above a second threshold, to bring back the display of the graphical element to an initial position around the anchor point.

10. A method for managing a touch interface, configured to detect an approach and a position of a finger of a user with respect to a screen of the interface, comprising:
    displaying at least one graphical element on the screen associated with a touch-selection zone, surrounding an anchor point of the graphical element on the screen, and located inside the same zone of influence;
    estimating repeatedly a trajectory of a point of the finger and an impact point of the trajectory on the screen;
    moving, when the impact point enters the zone of influence, the displayed graphical element and the associated touch-selection zone in a direction of the impact point; and
    displaying, as long as the impact point remains in the zone of influence, the graphical element and the associated touch-selection zone at a position which is a function of the updated impact point, and which becomes closer to the impact point as the finger approaches the screen.

* * * * *